US012587754B2

(12) United States Patent
Lan et al.

(10) Patent No.: US 12,587,754 B2
(45) Date of Patent: Mar. 24, 2026

(54) METHOD FOR DYNAMIC CORRECTION FOR PIXELS OF THERMAL IMAGE ARRAY

(71) Applicant: GOALTOP TECHNOLOGY CORPORATION, Zhubei City (TW)

(72) Inventors: Kuo-Neng Lan, Taoyuan City (TW); Shih-Feng Huang, Taoyuan City (TW)

(73) Assignee: GOALTOP TECHNOLOGY CORPORATION, Zhubei City (TW)

( * ) Notice: Subject to any disclaimer, the term of this patent is extended or adjusted under 35 U.S.C. 154(b) by 131 days.

(21) Appl. No.: 18/471,425

(22) Filed: Sep. 21, 2023

(65) Prior Publication Data

US 2025/0039572 A1     Jan. 30, 2025

(30) Foreign Application Priority Data

Jul. 28, 2023    (TW) .................................. 112128442

(51) Int. Cl.
*H04N 25/21*          (2023.01)
*H04N 25/20*          (2023.01)
          (Continued)

(52) U.S. Cl.
CPC .............. *H04N 25/21* (2023.01); *H04N 25/20* (2023.01); *H04N 25/671* (2023.01);
          (Continued)

(58) Field of Classification Search
CPC ...... H04N 25/67; H04N 25/671; H04N 25/68; H04N 25/683; H04N 25/69; H04N 23/20;
          (Continued)

(56) References Cited

U.S. PATENT DOCUMENTS 6,274,869 B1 *   8/2001   Butler .................... H04N 23/23
                                                  250/252.1
6,444,983 B1 *   9/2002   McManus ............ H04N 25/673
                                                  250/252.1
          (Continued)

FOREIGN PATENT DOCUMENTS

CN          110084795  A  *  8/2019  ........... G06T 7/0002
JP       2000298062  A  *  10/2000  ................ F41A 9/64
          (Continued)

OTHER PUBLICATIONS

J.D. Vincent, S.E. Hodges, J. Vampola, M. Stegall, & G. Pierce, Fundamentals of Infrared and Visible Detector Operation and Testing (2016), pp. 191-236 (Year: 2016).*

*Primary Examiner* — David N Werner
(74) *Attorney, Agent, or Firm* — MUNCY, GEISSLER, OLDS & LOWE, P.C.

(57)          ABSTRACT
A method for dynamic correction for pixels of thermal image array, which is applied to the factory correction of a bolometer, includes: individual resistance calculation step: at a reference temperature, a reference current is sequentially provided to the thermistors of all pixels in an image sensing array, to measure a corresponding resistance array values and recorded in a memory; individual current parameter calculation step: according to the resistance array values and a rated voltage value, respectively calculate a current array value, and record in the memory; and the step of confirming the rated voltage value: at the reference temperature, when reading the individual pixel voltage value of the image sensing array, provide the individual current parameter corresponding to each pixel according to the current array value, and confirm it corresponds to the rated voltage value.

4 Claims, 6 Drawing Sheets

(51) Int. Cl.
H04N 25/671 (2023.01)
H04N 25/673 (2023.01)
H04N 25/68 (2023.01)
H04N 25/70 (2023.01)

(52) U.S. Cl.
CPC ........... H04N 25/673 (2023.01); H04N 25/68 (2023.01); H04N 25/70 (2023.01)

(58) Field of Classification Search
CPC .......... H04N 23/21; H04N 23/23; H04N 5/33; H04N 25/673
See application file for complete search history.

(56) References Cited

U.S. PATENT DOCUMENTS

| | | | | |
|---|---|---|---|---|
| 7,470,902 | B1 * | 12/2008 | Kraemer | H04N 23/20 |
| | | | | 250/340 |
| 2001/0040216 | A1 * | 11/2001 | Knauth | H04N 25/671 |
| | | | | 348/E5.081 |
| 2002/0125430 | A1 * | 9/2002 | Wood | G01J 5/24 |
| | | | | 348/E5.09 |
| 2002/0164861 | A1 * | 11/2002 | Endoh | H04N 25/21 |
| | | | | 257/293 |
| 2002/0185601 | A1 * | 12/2002 | McManus | H04N 23/23 |
| | | | | 348/E5.09 |
| 2003/0160171 | A1 * | 8/2003 | Parrish | H04N 25/76 |
| | | | | 348/E5.081 |
| 2003/0213910 | A1 * | 11/2003 | Anderson | H04N 25/671 |
| | | | | 250/338.1 |
| 2003/0230733 | A1 * | 12/2003 | Tanaka | H04N 25/76 |
| | | | | 348/E5.09 |
| 2006/0071174 | A1 * | 4/2006 | Spartiotis | H10F 77/123 |
| | | | | 257/E31.016 |
| 2006/0231760 | A1 * | 10/2006 | Lee | H04N 25/21 |
| | | | | 348/E5.081 |
| 2009/0014652 | A1 * | 1/2009 | Chammings | H04N 25/77 |
| | | | | 348/E5.09 |
| 2009/0121139 | A1 * | 5/2009 | Chamming's | H04N 25/671 |
| | | | | 250/340 |
| 2009/0152465 | A1 * | 6/2009 | Dupont | H04N 25/673 |
| | | | | 250/338.1 |
| 2009/0212220 | A1 * | 8/2009 | Mizrahi | G01J 5/80 |
| | | | | 250/352 |
| 2012/0037805 | A1 * | 2/2012 | Dupont | H04N 25/673 |
| | | | | 250/340 |
| 2012/0119063 | A1 * | 5/2012 | Takamiya | H04N 25/671 |
| | | | | 250/208.1 |
| 2012/0182450 | A1 * | 7/2012 | Sato | H04N 25/78 |
| | | | | 348/E5.079 |
| 2013/0321671 | A1 * | 12/2013 | Cote | H04N 25/67 |
| | | | | 348/241 |
| 2013/0321678 | A1 * | 12/2013 | Cote | H04N 25/68 |
| | | | | 382/167 |
| 2013/0329098 | A1 * | 12/2013 | Lim | H04N 23/88 |
| | | | | 348/246 |
| 2014/0239180 | A1 * | 8/2014 | Vilain | H04N 23/23 |
| | | | | 250/338.4 |
| 2014/0291541 | A1 * | 10/2014 | Watanabe | G01T 1/16 |
| | | | | 250/394 |
| 2014/0367573 | A1 * | 12/2014 | Okuyama | H04N 25/20 |
| | | | | 250/338.4 |
| 2015/0319387 | A1 * | 11/2015 | Saragaglia | H04N 25/672 |
| | | | | 348/164 |
| 2015/0332441 | A1 * | 11/2015 | Högasten | H04N 25/671 |
| | | | | 348/148 |
| 2016/0044306 | A1 * | 2/2016 | Chahine | H04N 17/002 |
| | | | | 348/175 |
| 2016/0056785 | A1 * | 2/2016 | Wolfe | G01J 1/18 |
| | | | | 250/340 |
| 2016/0057369 | A1 * | 2/2016 | Wolfe | G01J 1/0228 |
| | | | | 348/322 |
| 2016/0224055 | A1 * | 8/2016 | Simolon | H04N 23/23 |
| 2016/0320241 | A1 * | 11/2016 | Alacoque | H04N 25/671 |
| 2016/0366349 | A1 * | 12/2016 | Nguyen | H04N 23/651 |
| 2017/0208261 | A1 * | 7/2017 | Kobayashi | H04N 25/67 |
| 2018/0100721 | A1 * | 4/2018 | Lee | H04N 23/23 |
| 2018/0184028 | A1 * | 6/2018 | Saragaglia | H04N 25/671 |
| 2018/0316882 | A1 * | 11/2018 | Saragaglia | H04N 25/671 |
| 2018/0352174 | A1 * | 12/2018 | Kuybeda | H04N 25/671 |
| 2020/0020726 | A1 * | 1/2020 | Anas | H04N 23/667 |
| 2020/0120292 | A1 * | 4/2020 | Cologlu | H04N 25/78 |
| 2020/0149972 | A1 * | 5/2020 | Chiesi | G01J 5/24 |
| 2020/0186712 | A1 * | 6/2020 | Högasten | H04N 25/673 |
| 2020/0200609 | A1 * | 6/2020 | Weng | H04N 25/76 |
| 2020/0202569 | A1 * | 6/2020 | Sandsten | H04N 25/21 |
| 2021/0377462 | A1 * | 12/2021 | Kawazu | H04N 25/76 |
| 2022/0247956 | A1 * | 8/2022 | Kobayashi | H10F 39/802 |
| 2022/0283036 | A1 * | 9/2022 | Everett | G01J 5/061 |
| 2023/0007158 | A1 * | 1/2023 | Hayashi | H04N 7/18 |
| 2023/0019063 | A1 * | 1/2023 | Rutkiewicz | H04N 25/75 |
| 2023/0160751 | A1 * | 5/2023 | Simolon | H04N 25/78 |
| | | | | 374/121 |

FOREIGN PATENT DOCUMENTS

| | | | | | |
|---|---|---|---|---|---|
| JP | 2008185465 | A | * | 8/2008 | G01J 5/20 |
| JP | 2019138715 | A | | 8/2019 | |
| KR | 20150098567 | A | * | 8/2015 | H04N 5/217 |
| KR | 1017105063 | B1 | * | 2/2017 | H04N 5/367 |
| WO | WO-9701926 | A2 | * | 1/1997 | G01J 5/061 |
| WO | WO2010106286 | A | * | 9/2010 | G01J 5/22 |
| WO | WO-2022254137 | A1 | * | 12/2022 | H04N 25/673 |
| WO | WO-2022264390 | A1 | | 12/2022 | |

* cited by examiner

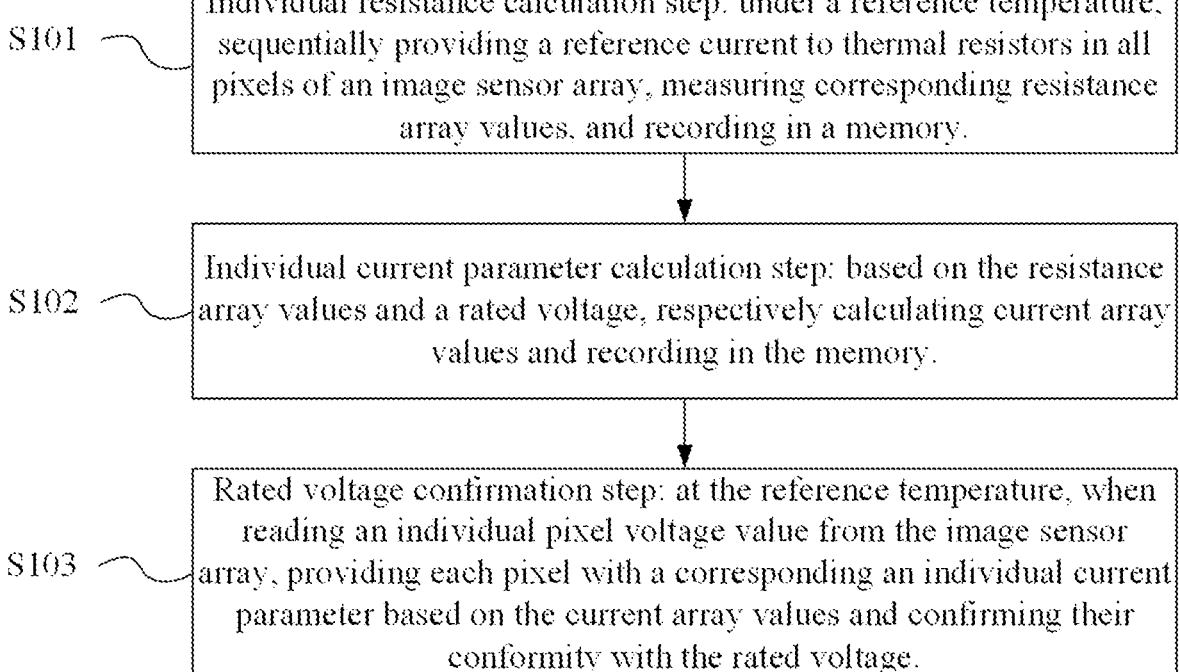

S101

Individual resistance calculation step: under a reference temperature, sequentially providing a reference current to thermal resistors in all pixels of an image sensor array, measuring corresponding resistance array values, and recording in a memory.

S102

Individual current parameter calculation step: based on the resistance array values and a rated voltage, respectively calculating current array values and recording in the memory.

S103

Rated voltage confirmation step: at the reference temperature, when reading an individual pixel voltage value from the image sensor array, providing each pixel with a corresponding an individual current parameter based on the current array values and confirming their conformity with the rated voltage.

FIG.3A

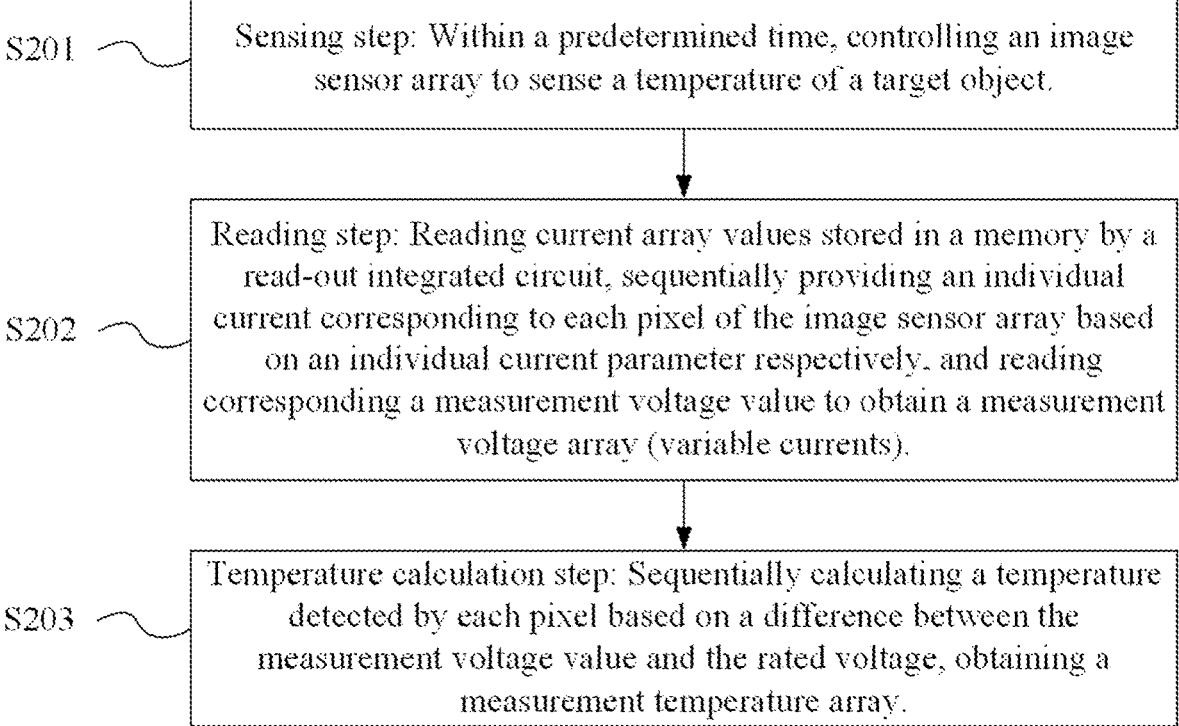

S201 — Sensing step: Within a predetermined time, controlling an image sensor array to sense a temperature of a target object.

S202 — Reading step: Reading current array values stored in a memory by a read-out integrated circuit, sequentially providing an individual current corresponding to each pixel of the image sensor array based on an individual current parameter respectively, and reading corresponding a measurement voltage value to obtain a measurement voltage array (variable currents).

S203 — Temperature calculation step: Sequentially calculating a temperature detected by each pixel based on a difference between the measurement voltage value and the rated voltage, obtaining a measurement temperature array.

FIG.3B

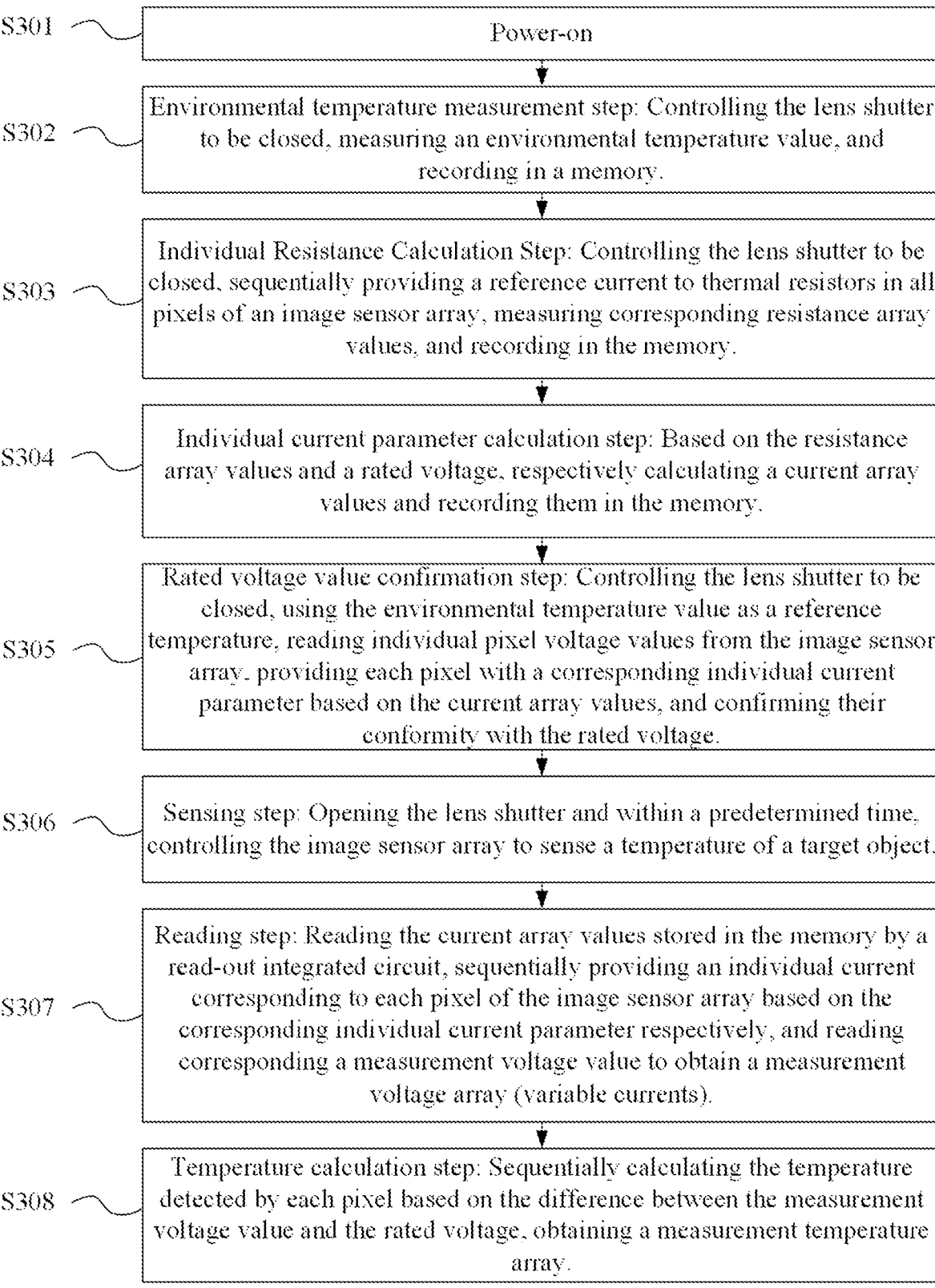

S301    Power-on

S302    Environmental temperature measurement step: Controlling the lens shutter to be closed, measuring an environmental temperature value, and recording in a memory.

S303    Individual Resistance Calculation Step: Controlling the lens shutter to be closed, sequentially providing a reference current to thermal resistors in all pixels of an image sensor array, measuring corresponding resistance array values, and recording in the memory.

S304    Individual current parameter calculation step: Based on the resistance array values and a rated voltage, respectively calculating a current array values and recording them in the memory.

S305    Rated voltage value confirmation step: Controlling the lens shutter to be closed, using the environmental temperature value as a reference temperature, reading individual pixel voltage values from the image sensor array, providing each pixel with a corresponding individual current parameter based on the current array values, and confirming their conformity with the rated voltage.

S306    Sensing step: Opening the lens shutter and within a predetermined time, controlling the image sensor array to sense a temperature of a target object.

S307    Reading step: Reading the current array values stored in the memory by a read-out integrated circuit, sequentially providing an individual current corresponding to each pixel of the image sensor array based on the corresponding individual current parameter respectively, and reading corresponding a measurement voltage value to obtain a measurement voltage array (variable currents).

S308    Temperature calculation step: Sequentially calculating the temperature detected by each pixel based on the difference between the measurement voltage value and the rated voltage, obtaining a measurement temperature array.

FIG.4

METHOD FOR DYNAMIC CORRECTION FOR PIXELS OF THERMAL IMAGE ARRAY

BACKGROUND

1. Technical Field

The disclosure relates to a thermal image array pixel compensation technology, and more particularly to a method for dynamic correction for pixels of thermal image array.

2. Background

Currently, when using a bolometer for infrared thermal imaging, a microarray structure is employed as the architecture for infrared sensing. In the manufacturing process, the bolometer focal plane array (Bolometer FPA) is fabricated on top of the read-out integrated circuit (ROIC), using semiconductor processes to create multi-layered microelectromechanical systems (MEMS) structures. Each pixel on the focal plane array represents an individual thermal resistor, and the basic principle of capturing thermal images is as follows: the compound thin-film thermal resistor within the MEMS structure is subjected to a constant current. When the temperature of the object being measured changes, the resistance value of the thermal resistor also changes, resulting in a corresponding variation in output voltage. By utilizing an appropriate gain amplifier to amplify these voltage changes ($\Delta V$), the temperature variation ($\Delta T$) can be deduced. Calculating the temperature variations for all the thermal resistors on the image array allows the temperature distribution of the object being measured to be obtained. Finally, through image processing, the thermal image of the object being measured can be composed and presented.

The materials commonly used for the thermal resistors that constitute the bolometer array for infrared thermal imaging include: amorphous silicon, vanadium oxide (VOx), indium arsenide (InAsx), zinc oxide (ZnOx), and others. However, due to sensitivity considerations, vanadium oxide (VOx) is the most widely used material, followed by amorphous silicon, while other materials are less common in commercial bolometer arrays.

Since each thermal resistor in the pixel array is formed using compound material thin films, it is challenging to achieve complete uniformity in the film composition for every pixel during the semiconductor deposition process. Process stability affects the fabrication of these thermal resistors, and variations can occur. For instance, in the case of vanadium oxide (VOx), the proportion of x (V and O ratio) in VOx is controlled using sputtering or evaporation processes. Even with careful control during the film deposition process to make each pixel have similar (very close) x values, they cannot achieve exact uniformity in terms of film thickness and area for each pixel. As a result, after applying a constant current, the thermal resistors in each pixel will exhibit significant variations in voltage values. To mitigate this non-uniformity, correction processes are commonly employed. However, due to significant differences in characteristics between individual pixels, the temperature range of the bolometer array is often limited, and the yield of the products cannot be effectively increased. Consequently, commercially available bolometer array chip are often shipped with different sensing temperature ranges and remain expensive.

The imaging principle of the bolometer array chip is based on using a thermal resistor array to measure the temperature distribution of the environment or an object for imaging purposes. The thermal resistors exhibit changes in resistance values at different temperatures. Ideally, if the characteristics of the thermal resistors in each pixel were exactly the same, then after measuring the resistance values of each thermal resistor at specific temperatures during the chip manufacturing process, it would be possible to achieve accurate imaging and temperature measurements during actual use. However, in reality, there are process deviations in any precision semiconductor manufacturing process. Thus, the distribution of thermal resistors in the bolometer array chip may be as shown in FIG. 1A, where there are M×N pixels in the bolometer array 10, and the resistance values of, for example, pixel 11-0-0, pixel 11-0-2, pixel 11-0-M, pixel 11-N-2, pixel 11-N-M, etc., represented by resistance R(0,0), R(0,2), R(0,M), R(N,2), R(N,M), respectively, may all be different.

Due to the differing resistance values of thermal resistors in each pixel, conventional techniques typically choose the highest resistance value (most abundant quantity) from the resistance distribution at the reference temperature to serve as the reference resistance. The appropriate current value (constant current) to be provided by the current source is then calculated using this reference resistance. By using the formula V=IR(voltage=current*resistance), this constant current value is used to calculate the output voltage of each pixel. By comparing the voltage variations at different temperatures and the reference temperature, the temperature changes can be deduced and used for subsequent imaging. Through the practice of this conventional technology, after outputting a constant current, the output voltage of the pixel array at a specific temperature of the bolometer array chip is as shown in FIG. 1B. Among the M×N pixels of the bolometer array 10, the pixels 11-0-0, pixel 11-0-2, pixel 11-0-M, pixel 11-N-2, pixel 11-N-M, etc., because their corresponding resistances may be different, and the corresponding voltage V(0,0), voltage V(0,2), voltage V(0,M), voltage V(N,2), and voltage V(N,M) are different.

As shown in FIG. 1B, the problem with this conventional technology is that pixels with significantly different resistance values compared to the reference resistance may exhibit the following results: pixels with excessively high output voltage are prone to saturation even with slightly higher gain settings in the power amplifier, creating bright spots; conversely, pixels with low output voltage may not provide sufficient temperature change signals at slightly lower power amplifier settings, leading to dark spots. This narrow range of power amplifier settings due to oversaturation or low output voltage in some pixels leads to reduced yield and sensitivity performance of the bolometer. These pixels that are prone to oversaturation or low output voltage are referred to as "dead pixels," "weak pixels," or "blind pixels."

Many conventional techniques are specifically designed to compensate for blind pixels, making them operational, such as Patent CNA-101980283A, which discloses a dynamic blind pixel compensation method using the values of adjacent pixels to compensate for blind pixels. However, these compensation techniques usually focus on correcting bright or dark pixels and do not solve the technical problem of pixel resistance non-uniformity caused by the fabrication process.

Consequently, developing a solution to address the issue of pixel resistance non-uniformity caused by the fabrication process in bolometer array chip, while expanding the dynamic range of the read-out integrated circuit (ROIC) and improving production yield (increasing the number of usable chips), has become a significant market demand and a technological goal pursued by various manufacturers.

SUMMARY

In view of the aforementioned issue, the present invention proposes a method for dynamic correction for pixels of thermal image array. This method applies different currents to individual pixels at the reference temperature to ensure that each pixel outputs the same voltage, achieving the goal of individual pixel correction. It effectively addresses the technical problem of pixel resistance non-uniformity caused by the fabrication process and achieves multiple special technological benefits, such as significantly improving production yield and expanding the dynamic range of the read-out integrated circuit (ROIC).

The present invention further provides a method for dynamic correction for pixels of thermal image array, used for pre-shipment correction of a bolometer. It includes the following steps: individual resistance calculation step: under a reference temperature, sequentially providing a reference current to thermal resistors in all pixels of an image sensor array, measuring corresponding resistance array values, and recording in a memory; individual current parameter calculation step: based on the resistance array values and a rated voltage, respectively calculating current array values and recording in the memory; and rated voltage confirmation step: at the reference temperature, when reading an individual pixel voltage value from the image sensor array, providing each pixel with a corresponding an individual current parameter based on the current array values and confirming their conformity with the rated voltage.

The present invention further provides a method for dynamic correction for pixels of thermal image array, used for post-shipment temperature measurement of a bolometer. It includes the following steps: sensing step: within a predetermined time, controlling an image sensor array to sense a temperature of a target object; reading step: reading current array values stored in a memory by a read-out integrated circuit, sequentially providing an individual current corresponding to each pixel of the image sensor array based on an individual current parameter respectively, and reading corresponding a measurement voltage value to obtain a measurement voltage array; and temperature calculation step: sequentially calculating a temperature detected by each pixel based on a difference between the measurement voltage value and the rated voltage, obtaining a measurement temperature array.

Additionally, the present invention provides a method for dynamic correction for pixels of thermal image array, used for a bolometer with a lens shutter. It includes the following steps: power-on step; environmental temperature measurement step: controlling the lens shutter to be closed, measuring an environmental temperature value, and recording in a memory; individual resistance calculation step: controlling the lens shutter to be closed, sequentially providing a reference current to thermal resistors in all pixels of an image sensor array, measuring corresponding resistance array values, and recording in the memory; individual current parameter calculation step: based on the resistance array values and a rated voltage, respectively calculating a current array values and recording them in the memory; rated voltage confirmation step: controlling the lens shutter to be closed, using the environmental temperature value as a reference temperature, reading individual pixel voltage values from the image sensor array, providing each pixel with a corresponding individual current parameter based on the current array values, and confirming their conformity with the rated voltage; sensing step: opening the lens shutter and within a predetermined time, controlling the image sensor array to sense a temperature of a target object; reading step: reading the current array values stored in the memory by a read-out integrated circuit, sequentially providing an individual current corresponding to each pixel of the image sensor array based on the corresponding individual current parameter respectively, and reading corresponding a measurement voltage value to obtain a measurement voltage array; temperature calculation step: sequentially calculating the temperature detected by each pixel based on the difference between the measurement voltage value and the rated voltage, obtaining a measurement temperature array.

In the following embodiments, the detailed features and advantages of the present invention are described in a manner sufficient for any skilled artisan to understand the technical content of the invention and implement it. Based on the content disclosed in this specification, the scope of the patent application, and the drawings, any person skilled in the art can easily grasp the objectives and advantages of the present invention.

BRIEF DESCRIPTION OF THE DRAWINGS

The structure, operating principle and effects of the disclosure will be described in detail by way of various embodiments which are illustrated in the accompanying drawings.

FIGS. 3A to 3B: These figures illustrate specific implementations of the method for dynamic correction for pixels of thermal image array for bolometer products without a lens shutter.

FIG. 4: This figure demonstrates a specific implementation of the method for dynamic correction for pixels of thermal image array for bolometer products with a lens shutter.

DETAILED DESCRIPTION

The present invention disclosed herein has been described by means of specific embodiments. However, numerous modifications, variations and enhancements can be made thereto by those skilled in the art without departing from the spirit and scope of the disclosure set forth in the claims.

It is to be acknowledged that, although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to"

or "directly coupled to" another element or layer, there are no intervening elements or layers present.

In addition, unless explicitly described to the contrary, the words "comprise" and "include", and variations such as "comprises", "comprising", "includes", or "including", will be acknowledged to imply the inclusion of stated elements but not the exclusion of any other elements.

The present invention's method for dynamic correction for pixels of thermal image array is applied at the reference temperature by providing different currents to individual pixels with different resistance values, ensuring that each pixel outputs the same voltage. This achieves the goal of single-pixel correction and addresses the technical issue of non-uniformity in pixel resistance caused by the manufacturing process. Additionally, it effectively increases production yield and expands the dynamic range of the ROIC due to its unique and advantageous technological effects.

Figure 1A:
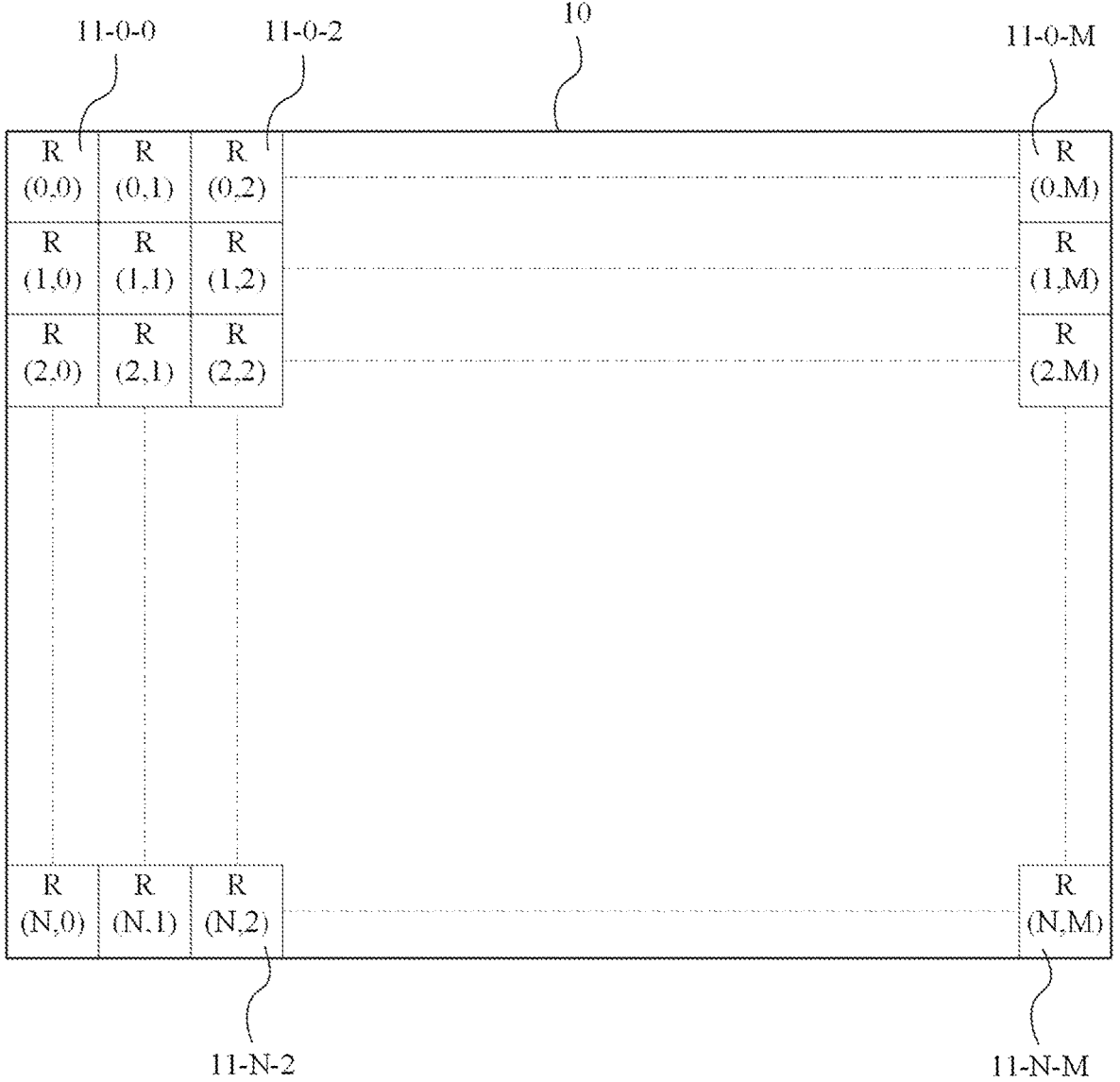
FIGS. 1A and 1B: These figures depict schematic diagrams of resistance and voltage values measured by conventional bolometer arrays.
Figure 1B:
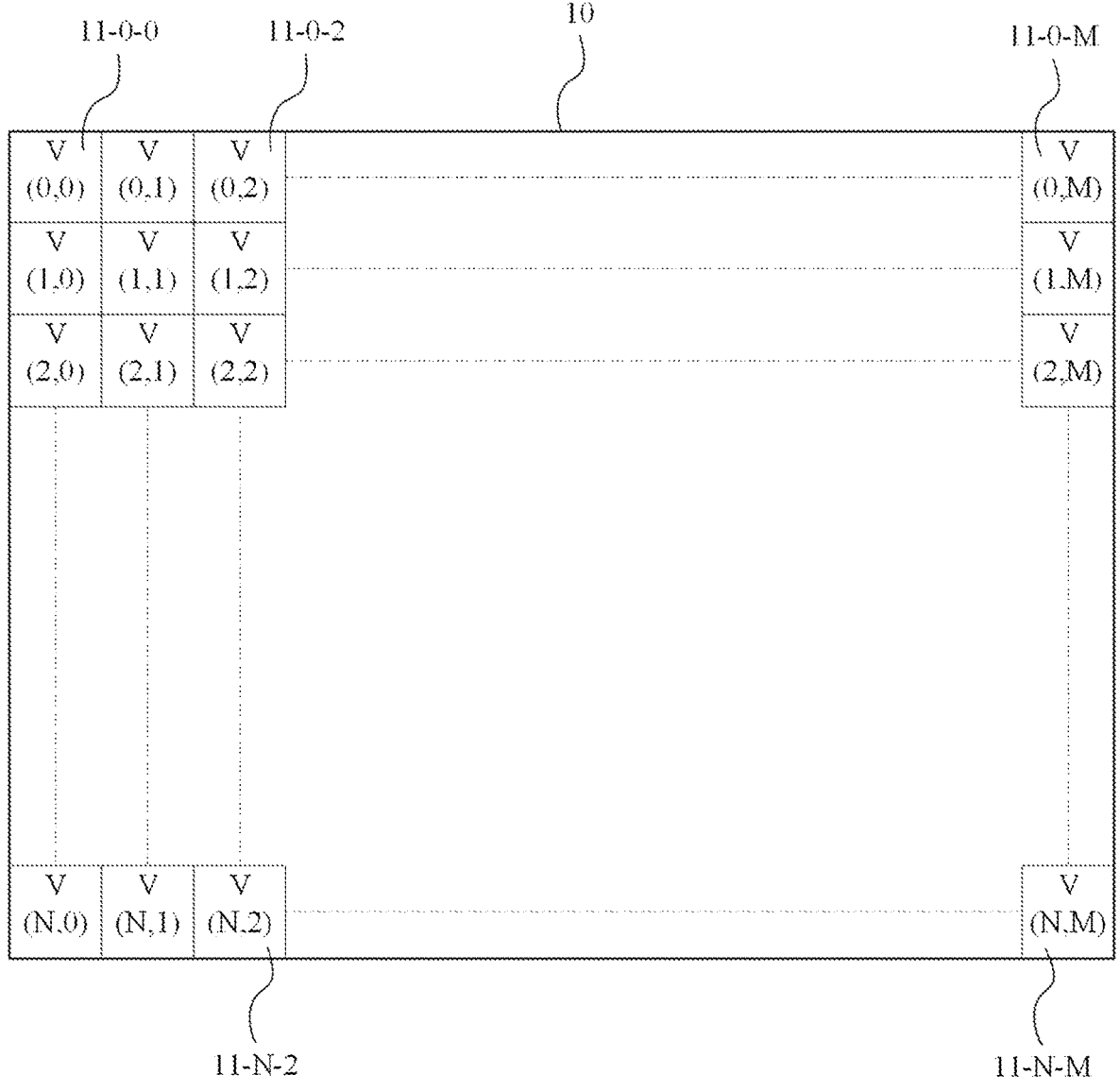
Figure 2:
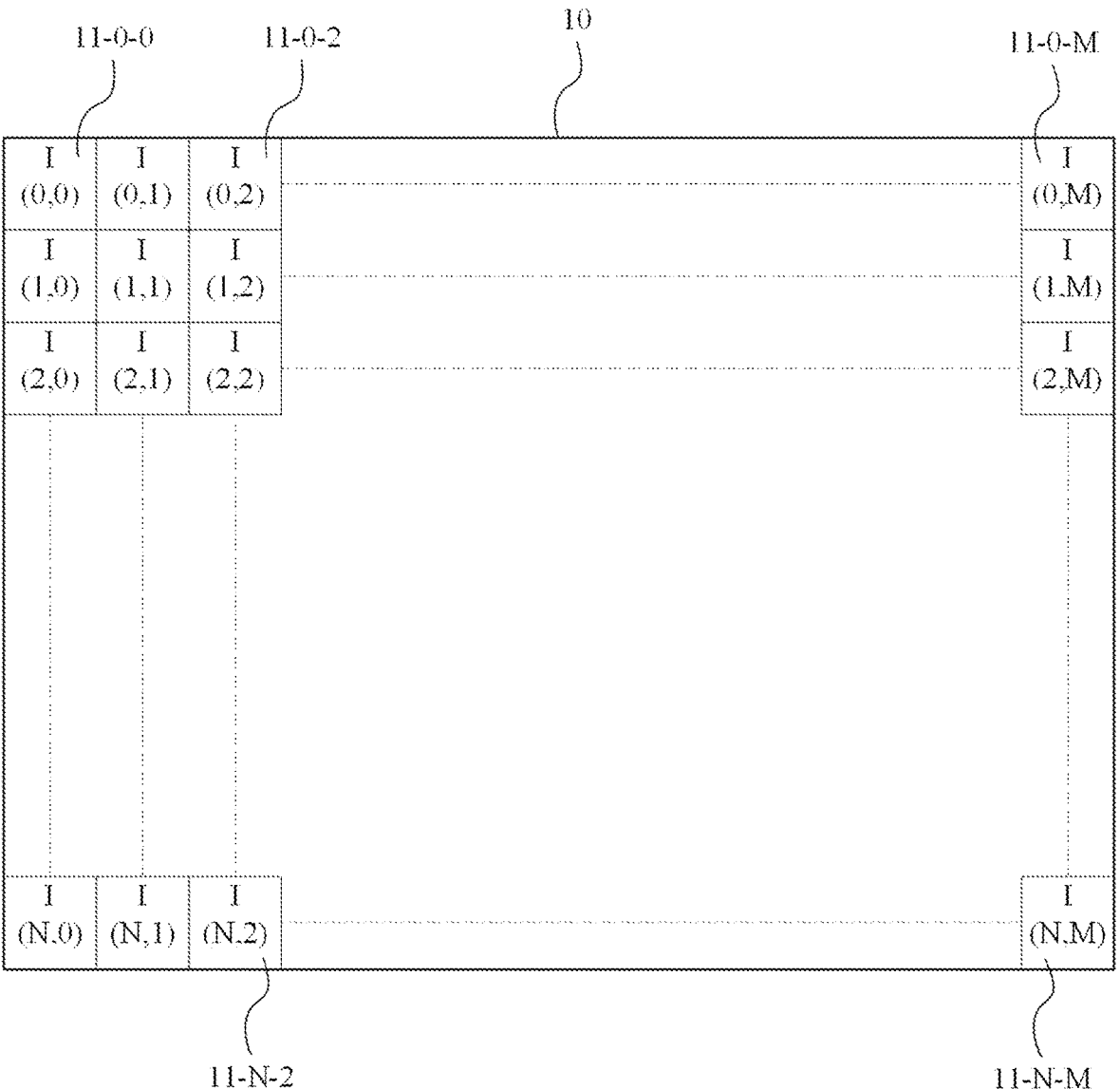
FIG. 2: The figure represents the dynamic current compensation method provided by the present invention for thermal imaging array pixel dynamic correction.

Please refer to FIG. 2, which illustrates the application of the present invention's method for dynamic correction for pixels of thermal image array applied to the image array shown in FIGS. 1A and 1B. This method is referred to as the "dynamic current compensation method." Based on the resistance distribution R(y,x) shown in FIG. 1A, the method uses the formula: Vconst=I(y,x)×R(y,x) to calculate the I(y,x) values. During operation, the ROIC provides different current values to each pixel (y,x) based on their corresponding I(y,x) values. The output currents to the pixel array are depicted in FIG. 2, where for each pixel (e.g., pixel 11-0-0, pixel 11-0-2, pixel 11-0-M, pixel 11-N-2, pixel 11-N-M), variable currents are provided to ensure that the corresponding voltages are equal to Vconst. In other words, the currents are adjusted as follows: I(0,0)=Vconst/Resistance R(0,0), I(0,2)=Vconst/Resistance R(0,2), I(0,M)=Vconst/Resistance R(0,M), I(N,2)=Vconst/Resistance R(N,2), and I(N,M)=Vconst/Resistance R(N,M).

Wherein, Vconst represents a constant output voltage, and I(y,x) represents the distribution of individual currents for each pixel calculated based on the resistance distribution R(y,x) shown in FIG. 1A. At a specific correction temperature, the output voltage of each pixel will no longer be different, as seen in FIG. 1B, but rather, all pixels will output the same constant voltage, Vconst.

Since, at a specific temperature, each pixel outputs the same constant voltage, the dynamic range of the gain amplifier can be significantly increased. This, in turn, enhances the chip's yield and sensitivity performance.

Next, please refer to FIG. 3A, which illustrates the correction process of the present invention's method for dynamic correction for pixels of thermal image array for pre-shipment:

Step S101: Individual resistance calculation step: under a reference temperature, sequentially providing a reference current to thermal resistors in all pixels of an image sensor array, measuring corresponding resistance array values, and recording in a memory. This corresponds to the process shown in FIG. 1A. The memory can be a SPI Flash memory or non-volatile memory built into the microcontroller.

Step S102: Individual current parameter calculation step: based on the resistance array values and a rated voltage, respectively calculating current array values and recording in the memory. This utilizes the previously mentioned formula Vconst=I(y,x)×R(y,x), where Vconst is the rated voltage value. The rated voltage value can be adjusted dynamically based on various factors, such as the characteristics of the compound material in the thermal-sensitive resistors, the manufacturing process, the product's sensitivity requirements, and the temperature measurement range.

Step S103: Rated voltage confirmation step: at the reference temperature, when reading an individual pixel voltage value from the image sensor array, providing each pixel with a corresponding an individual current parameter based on the current array values and confirming their conformity with the rated voltage. Confirm that they match the rated voltage value. Once the measured values match the rated voltage value, it indicates that the correction process for the bolometer array chip is complete, and it can be ready for shipment.

Next, please refer to FIG. 3B, which illustrates the correction process of the present invention's method for dynamic correction for pixels of thermal image array for post-shipment temperature measurement:

Step S201: Sensing step: Within a predetermined time, controlling an image sensor array to sense a temperature of a target object. After the microcontroller has completed the basic control check procedure upon startup for the bolometer array chip, it can initiate the temperature measurement process. Upon receiving the temperature measurement command, the sensing process begins. This step is part of the known technology and does not require further elaboration.

Step S202: Reading step: Reading current array values stored in a memory by a read-out integrated circuit, sequentially providing an individual current corresponding to each pixel of the image sensor array based on an individual current parameter respectively, and reading corresponding a measurement voltage value to obtain a measurement voltage array (variable currents). The ROIC then reads the corresponding voltage values for each pixel to obtain the measurement voltage array values. This step is the key feature of the present invention. As described in Background, the conventional technology measures the pixel voltages using constant currents. However, in the present invention, the microcontroller controls the ROIC to read the individual current parameters (referred to as the individual current parameter table for current array values) for each pixel stored in memory and then provides individually defined current values (variable currents) to each pixel before reading their voltage values.

Step S203: Temperature calculation step: Sequentially calculating a temperature detected by each pixel based on a difference between the measurement voltage value and the rated voltage, obtaining a measurement temperature array. The difference between the measurement voltage value and the rated voltage value represents the temperature difference detected by each pixel. As each pixel has a different current, their temperature measurement characteristics differ, allowing for more accurate individual temperature differences. Therefore, the present invention's method can improve the sensitivity and accuracy of the thermal imaging array.

Next, please refer to FIG. 4, which illustrates the correction process of the present invention's method for dynamic correction for pixels of thermal image array for adaptive dynamic current compensation after manufacturing. In some embodiments of the present invention, the terminal thermal imager has a lens shutter structure, and the microcontroller can control the opening and closing of the lens shutter to control the entry of external light sources. This control in such products can be considered as the present invention's adaptive dynamic current compensation method, which means performing current compensation correction every time the device is powered on. The process includes the following steps:

Step S301: Power-on. Each time the device is powered on, current compensation correction is performed again.

Step S302: Environmental temperature measurement step: Controlling the lens shutter to be closed, measuring an environmental temperature value, and recording in a memory. The current ambient temperature at that moment can be used as the reference temperature. This measurement is taken with the lens shutter closed and no external light source entering. The measurement temperature at this point represents the thermal imager's current temperature. Since the dynamic current compensation temperature correction has been performed before shipment, it can be used as the reference for temperature measurement.

Step S303: Individual Resistance Calculation Step: Controlling the lens shutter to be closed, sequentially providing a reference current to thermal resistors in all pixels of an image sensor array, measuring corresponding resistance array values, and recording in the memory. Unlike Step S101 in FIG. 3A, this step serves as the reference temperature with the lens shutter closed, while Step S101 measures at a reference temperature fixture that emits uniform temperature.

Step S304: Individual current parameter calculation step: Based on the resistance array values and a rated voltage, respectively calculating a current array values and recording them in the memory. This step is similar to Step S102 and does not require further elaboration.

Step S305: Rated voltage value confirmation step: Controlling the lens shutter to be closed, using the environmental temperature value as a reference temperature, reading individual pixel voltage values from the image sensor array, providing each pixel with a corresponding individual current parameter based on the current array values, and confirming their conformity with the rated voltage. This step is similar to Step S103 and does not require further elaboration.

Step S306: Sensing step: Opening the lens shutter and within a predetermined time, controlling the image sensor array to sense a temperature of a target object. Before this step, there are still many small steps, which are omitted here. The sensing step starts when the user inputs the temperature measurement control command. In this embodiment, the sensing step starts after the adaptive correction steps of Steps S301 to S305 and upon receiving the control command.

Step S307: Reading step: Reading the current array values stored in the memory by a read-out integrated circuit, sequentially providing an individual current corresponding to each pixel of the image sensor array based on the corresponding individual current parameter respectively, and reading corresponding a measurement voltage value to obtain a measurement voltage array (variable currents). The ROIC then reads the corresponding voltage values for each pixel to obtain a measurement voltage array values. This step is similar to Step S202 and does not require further elaboration.

Step S308: Temperature calculation step: Sequentially calculating the temperature detected by each pixel based on the difference between the measurement voltage value and the rated voltage, obtaining a measurement temperature array. This step is similar to Step S203 and does not require further elaboration.

In the aforementioned embodiments, the present invention's dynamic current compensation method can be applied to thermal imaging products with or without lens shutters. For thermal imaging products without lens shutters, the factory-set dynamic current compensation method can be used. For thermal imaging products with lens shutters, the adaptive dynamic current compensation method can be adopted.

By using the present invention's dynamic current compensation method, the technical problem of inconsistent resistances between pixels caused by the thermal imaging array chip can be resolved. Moreover, it can achieve various technical benefits, such as improving production yield, increasing sensitivity for temperature measurement, and expanding the dynamic range.

The present invention disclosed herein has been described by means of specific embodiments. However, numerous modifications, variations and enhancements can be made thereto by those skilled in the art without departing from the spirit and scope of the disclosure set forth in the claims.

What is claimed is:

1. A method for dynamic correction for pixels of thermal image array, used for pre-shipment correction of a bolometer, comprising:

individual resistance calculation step comprising:
    under a reference temperature, sequentially providing a reference current to thermal resistors in all pixels of an image sensor array,
    measuring corresponding resistance array values, and
    recording in a memory;
individual current parameter calculation step comprising:
    based on the resistance array values and a rated voltage, respectively calculating current array values, and
    recording in the memory; and
rated voltage confirmation step comprising:
    at the reference temperature, when reading an individual pixel voltage value from the image sensor array, providing each pixel with a corresponding an individual current parameter based on the current array values, and
    confirming their conformity with the rated voltage.

2. The method for dynamic correction for pixels of thermal image array according to claim 1, wherein the memory is selected from: a flash memory or a built-in non-volatile memory in a microcontroller.

3. A method for dynamic correction for pixels of thermal image array, used for a bolometer with a lens shutter, comprising:

power-on step;
environmental temperature measurement step comprising:
    controlling the lens shutter to be closed,
    measuring an environmental temperature value, and
    recording in a memory;
individual resistance calculation step comprising:
    controlling the lens shutter to be closed,
    sequentially providing a reference current to thermal resistors in all pixels of an image sensor array,
    measuring corresponding resistance array values, and
    recording in the memory;
individual current parameter calculation step comprising:
    based on the resistance array values and a rated voltage, respectively calculating a current array values, and
    recording them in the memory;
rated voltage confirmation step comprising:
    controlling the lens shutter to be closed,
    using the environmental temperature value as a reference temperature, reading individual pixel voltage values from the image sensor array,
    providing each pixel with a corresponding individual current parameter based on the current array values, and
    confirming their conformity with the rated voltage;
sensing step comprising:

opening the lens shutter and within a predetermined time, and controlling the image sensor array to sense a temperature of a target object;

reading step comprising:

reading the current array values stored in the memory by a read-out integrated circuit, sequentially providing an individual current corresponding to each pixel of the image sensor array based on the corresponding individual current parameter respectively, and reading corresponding a measurement voltage value to obtain a measurement voltage array;

temperature calculation step comprising:

sequentially calculating the temperature detected by each pixel based on the difference between the measurement voltage value and the rated voltage, and obtaining a measurement temperature array.

4. The method for dynamic correction for pixels of thermal image array according to claim 3, wherein the memory is selected from: a flash memory or a built-in non-volatile memory in a microcontroller.

\* \* \* \* \*